United States Patent [19]

Knoche

[11] 3,855,340
[45] Dec. 17, 1974

[54] METHOD OF DISMUTATION OF OLEFINS, CATALYST EMPLOYED AND PRODUCTS OBTAINED

[75] Inventor: Hubert Knoche, Meyzieu, France

[73] Assignee: Entreprise De Recherches Et D'Activites Petrolieres Elf., Paris, France

[22] Filed: Jan. 23, 1973

[21] Appl. No.: 326,073

Related U.S. Application Data

[63] Continuation of Ser. No. 38,490, May 18, 1970, abandoned.

[30] Foreign Application Priority Data

May 22, 1969 France .......................... 69.16711

[52] U.S. Cl............................................ 260/683 D
[51] Int. Cl............................................. C07c 3/62
[58] Field of Search ................................ 260/683 D

[56] References Cited
UNITED STATES PATENTS

| | | | |
|---|---|---|---|
| 3,652,704 | 3/1972 | Eades et al. | 260/683 |
| 3,535,401 | 10/1970 | Calderon et al. | 260/683 |
| 3,222,337 | 12/1965 | Coover | 260/88.2 |

*Primary Examiner*—Delbert E. Gantz
*Assistant Examiner*—C. E. Spresser
*Attorney, Agent, or Firm*—Cameron, Kerkam, Sutton, Stowell & Stowell

[57] ABSTRACT

The method consists in carrying out the dismutation reaction by catalysis in homogeneous phase, the catalyst employed being an alcoholate of molybdenum or tungsten in solution in a hydrocarbon to which is added an organometallic reducing agent and especially a halogenated aluminium organometallic compound.

4 Claims, No Drawings

METHOD OF DISMUTATION OF OLEFINS, CATALYST EMPLOYED AND PRODUCTS OBTAINED

This is a continuation, of application Ser. No. 38,490, filed May 18, 1970, now abandoned.

This invention is concerned with the realization of olefin dismutation reactions, that is to say chemical reactions which make it possible to modify the distribution of the carbon atoms in ethylenic double bonds so as to yield olefinic derivatives which are different from the starting compounds. The invention proposes a method of dismutation of olefins which calls for the use of a novel catalyst and also extends to the catalyst as well as to the products obtained as a result of its application.

It is known that said dismutation reactions apply both to the treatment of a single compound in which the molecule (cyclic or open-chain) has a single double bond or a number of non-conjugated double bonds and to a mixture of a number of olefinic compounds having different formulae. It is also known that such reactions are carried out only in the presence of specific catalysts which have been developed for this purpose.

This invention is more particularly concerned with the methods of dismutation of olefins in which recourse is had to catalysts in homogeneous phase. Specific catalysts have already been proposed for the purpose of assisting the dismutation of olefins which were obtained by admixing a metallic compound, especially titanium but in some instances also molybdenum or tungsten, with a metal-organic reducing agent and more especially with an organometallic compound of halogenated aluminum. In all the known methods of this type, the compounds of molybdenum or tungsten are salts and it appears that, up to the present time, only the halogens such as tungsten chloride have yielded satisfactory results.

The use of salts of this type is attended by major disadvantages in the practical application of the method. In fact, the chlorides have low stability, are sensitive to atmospheric moisture in particular and to light; their use gives rise to corrosion problems.

The essential objective of this invention is to overcome the disadvantages of the methods employed in the prior art while retaining their advantages. The invention makes it possible to effect the dismutation of olefins by catalysis in homogeneous phase by utilizing a catalyst having constituents which are both stable and easy to handle. Moreover, the catalysts employed can be prepared with greater ease than the catalysts of prior art processes and are soluble both in aliphatic solvents and in aromatic hydrocarbons.

The advantage last mentioned is particularly appreciable in the application of dismutation reactions to the utilization of petroleum distillation fractions inasmuch as aliphatic solvents are more readily available in the petroleum refining industry.

Taking these different advantages into consideration, the method of dismutation of olefins in accordance with the invention can be carried out at considerably lower cost than was the case with the methods of the prior art.

The invention relates to a specific catalyst for the dismutation of olefins which is essentially constituted by an alcoholate of molybdenum or of tungsten and by a metalorganic reducing agent which is preferably constituted by an organometallic compound of halogenated aluminum.

The alcoholate employed is preferably a wholly substituted phenolate. Mention can be made in particular of tungsten hexaphenolate or tungsten oxyphenolate. The oxyphenolate WO $(C_6H_5O)_4$ is in any case more advantageous than the hexaphenolate WO $(C_6H_5O)_6$ since it is easier to prepare and can also be obtained from tungsten oxychloride which is less costly than the hexachloride. The alcoholate of the present invention has the formula $X[O]_n[O-R]_{l-2n}$ where $X$ is tungsten or molybdenum, $R$ is a remainder of alkyl or aryl hydrocarbide, $n$ is equal to 0 or 1 and $l$ is equal to 5 or 6.

In the catalysis of olefin dismutation reactions, the above-mentioned catalyst is advantageously employed in accordance with the invention by admixing an alcoholate of tungsten or of molybdenum with the olefinic compound or compounds to be treated in solution in a hydrocarbon and then adding the metalorganic reducing agent. The reaction is preferably carried out at a temperature within the range of 0°C to 50°C and in an inert atmosphere.

The relative molar proportions of metalorganic reducing agent and alcoholate in the catalyst are preferably determined by a value between 6 and 12 in the case of the ratio Al/Mo or Al/W.

The examples given hereunder illustrate the practical application of the invention. It is readily apparent that these examples are not to be interpreted in any limiting sense.

EXAMPLE 1

In 10 millimoles of 2-methylbutene-1 in solution in a hydrocarbon solvent (such as hexane, for example), there are introduced 5 mg of tungsten oxyphenolate WO $(C_6H_5O)_4$ (namely 0.011 millimole), then 0.08 millimole of metalorganic reducing agent. By way of example, said reducing agent can be a mixture of aluminum chloride and triethylaluminum, the sesquichloride or dichloride of an alkylaluminum. The reaction takes place at room temperature (20°C). The addition of traces of alcohol (0.003 g, for example) accelerates this reaction.

The dismutation of the treated olefinic compound results in the production of ethylene. Evolution of this latter in the gaseous state is permitted in order to displace the chemical equilibrium.

After 15 minutes of reaction, the catalyst is destroyed with one drop of ethanol (0.1 cm³). It is then found that 2-methylbutene-1 is completely transformed and that the 3,4-dimethylhexene-3 is formed with a yield of 95 %, the ratio of the cis and trans forms being approximately one-half.

EXAMPLE 2

Under the same conditions as in the foregoing example, a mixture of cis- and trans-pentene-2 in solution in chlorobenzene is treated at room temperature with a catalyst consisting of tungsten oxyphenolate WO $(C_6H_5O)_4$ and ethylaluminum dichloride EtAlCl$_2$, the proportions being as follows 10 millimoles of a mixture of cis- and trans-pentene-2, 5 mg tungsten oxyphenolate, namely 0.011 millimole and 0.1 millimole of ethylaluminum dichloride.

After 15 minutes of reaction, the mixture is analyzed by chromatography in gaseous phase; there is then observed the presence of 25 % cis- and trans-butene-2, 50 % cis- and trans-pentene-2 and 25 % cis- and trans-pentene-3.

EXAMPLE 3

0.13 millimole of tungsten oxyphenolate WO $(C_6H_5O)_4$ is introduced in a solution of 4.5 grams of a mixture of n-butenes (the ratio of butene-1 to cis- and trans-butene-2 is 2). There are then added 30 mg of ethyl alcohol and 1.6 cm$^3$ of ethylaluminum dichloride.

After 15 minutes, the gaseous phase and liquid phase are subjected to analysis and found to contain:

51 % olefins with a number of carbon atoms which is either lower than or equal to 6 and having the following distribution: ethylene 5 %, propene 10 %, butene-1 2 %, trans-butene-2 32 %, cis-butene-2 13 %, pentenes 36%, hexenes 9%, more than 6 carbons and polymer 49%.

EXAMPLE 4

There are introduced in 0.1 mole (8 cm$^3$) of cyclopentene 5 mg of tungsten oxyphenolate WO $(C_6H_5O)_4$ (namely 0.011 millimole), then 0.08 millimole of ethylaluminum dichloride in chlorobenzene. Polymerization starts immediately and the catalyst is destroyed after a few minutes with a few drops of methanol. A solid polymer having the properties of an elastomer is thus obtained.

EXAMPLE 5

Under the same conditions as Example 1, a mixture of 64 % of cis- and 36 % of trans-hexene-2 in solution in chlorobenzene is treated at room temperature with a catalyst consisting of tungsten hexaphenolate WO $(C_6H_5O)_6$ and ethyl-aluminum dichloride, the proportions being as follows:

10 millimoles of the mixture of cis- and trans-hexene-2, 8 mg of tungsten hexaphenolate, namely 0.01 millimole and 0.1 millimole of ethylaluminum dichloride.

After 15 minutes of reaction, the reaction mixture is analyzed by chromatography in gaseous phase. The major reaction product is thus identified as: butenes 10 %, pentenes 5 %, hexenes 55 %, heptenes 4 %, octenes 18 %, unidentified constituents 7 %.

What we claim is:

1. A method of dismutation of olefins, the reaction being carried out in homogeneous phase by contact of said olefin with a catalyst consisting of a mixture of an alcoholate having the formula:

$$X[O]_n[O\text{-}R]_{l-2n}$$

where $X$ is tungsten or molybdenum, $R$ a remainder of alkyl or aryl hydrocarbide, $n$ being equal to 0 or 1 and $l$ being equal to 5 or 6 with halogenated aluminum organometallic compound as a metal organic reducing agent, the relative molar proportions of metal organic reducing agent and alcoholate being between 6 and 12 for the ratio Al/Mo and Al/W.

2. A method according to claim 1, wherein said method including admixing tungsten or molybdenum phenolate with at least one olefinic compound to be treated in solution in a hydrocarbon and then adding an alkylaluminium sesquichloride or dichloride to the mixture.

3. A method according to claim 1, wherein the reaction being carried out at a temperature within the range of 0° to 50°C.

4. A method according to claim 3, the solvent hydrocarbon being an aliphatic hydrocarbon.

* * * * *